Patented July 12, 1927.

1,635,391

UNITED STATES PATENT OFFICE.

GEORGE B. WOOD, OF ROCKLAND, MAINE, ASSIGNOR TO ROCKLAND & ROCKPORT LIME CORPORATION, OF ROCKLAND, MAINE, A CORPORATION OF MAINE.

METHOD OF AND PRODUCT FOR MAKING PLASTER.

No Drawing. Application filed July 16, 1925. Serial No. 44,108.

My invention relates to the making of plaster and a novel method of working, as well as a new article of commerce. This new preparation comprises a special combination for plaster making in which the lime and fibre are provided in ready prepared and ready mixed condition by which the mixing of the plaster is greatly facilitated and very uniform and strong plaster made without the usual loss of time or extensive working which has been heretofore necessary in order to get good results.

There are several factors in the making of good plaster that are apt to be slighted either by lack of care or under the pressure of demand for speed in the work. It may be well to briefly note these at the outset.

One of the time factors involved in plaster making is the time required for the slaking of the lime. Not only does the slaking take time, but it requires time to cool before it can be used. Where hair is added, great care must be taken to allow for cooling, as the hair would otherwise be burned and rendered useless.

Furthermore, slaking of ordinary lime takes a good deal of time as it has to be carefully worked in order to get uniformity of result. It is, furthermore, difficult to work the binding material into the slaked lime or putty as it tends to mat and resist uniform distribution. Again, if the lime is not worked with an absolute uniformity, which can only be attained by time and faithful labor, defects are apt to appear in the wall.

Many plasters when spread on the wall develop pits that very seriously affect the appearance of the job. It has been noted that in plasters made from pulverized lime this pitting or popping seldom occur. Pulverized lime is necessarily somewhat more expensive than lime not so prepared and unless the matter of expense can be offset by economies in other materials, time or labor, the somewhat higher price is a deterring factor for the average contractor.

My invention contemplates a product in which economy in all these factors is effected so that the product can be made available at a fair commercial price that makes it economical to use and gives a great perfection in result.

As a substitute for hair, certain vegetable fibres have been used, but these have to be softened in order to make them usable in plaster that is to be spread on laths. It has been proposed to effect this softening by putting the fibres in during the slaking of ordinary lime, so that the heat and moisture during slaking will effect the softening of the fibre. While this is theoretically possible and has I believe been tried out, it is subject to the same difficulties that have been above enumerated and the fibre is apt to be softened too much or too little or not uniformly, and a good deal of time and working is required to get satisfactory results.

My invention contemplates a new departure in practice and I have been able to overcome all these difficulties by initially combining pulverized lime in a dry unslaked state with a vegetable fibre in a thorough proportioned mixture. Such a mixture provides a new factor in plaster making. It introduces in a single novel product a combination of old and accepted elements in a relation that utilizes their factors of advantage and eliminates their undesirable tendencies. The distribution of the fibre can be more thoroughly provided for at the plant by my method than it can be done on the job, and the product is capable of being packed and shipped and kept with no more difficulty than ordinary lime.

Such a product is quickly and easily handled on the job. It slakes with great speed and uniformity and the softening of the fibre is effected more rapidly and with great uniformity. These economies fully justify any increased expense of the pulverized lime, so that a perfection of surface on the wall is assured without any real additional cost. Furthermore, as a commercial product, this mixture is extremely convenient. The powdered lime and the fibre intermingle so that the product is not bulky and uniformity of mixture is preserved. The fibre has a tendency to keep the pulverized lime in its pulverized state and prevent it from caking in the pack or barrel and makes it very easy to wet up in the mortar bed. The lime in turn prevents the fibre from matting.

In practice, the lime is pulverized and brought to about a fifty mesh fineness. The proper proportion of vegetable fibre is then shaken out and preferably carded and the fibre and lime thoroughly mixed.

Almost any of the vegetable fibres used in plaster making may be employed, although I find that the sisal fibre undergoes softening or partial digestion in just about the time and at just about the temperatures involved in the slaking of lime of this fineness, so that the combination automatically times itself in working without requiring undue attention by the mixer.

The reducing or softening action on the fibre is marked and peculiar. It has been the practice to soak out fibre for plaster making prior to its introduction into the mixture. Such soaking was an additional step and inefficient. It only partly softened the fibre and the result was not uniform or dependable.

These vegetable fibres, notably such as sisal seem to be bundles of long very fine unitary fibre bonded together in a coarser easily isolated fibre in which it usually appears in commerce. The binder is a gummy material probably ligno-cellulose and the softening of the composite fibre is effected by the disintegration or release of this binder.

By my method of the preparation of material and its working, the fibre is softened by the action of the hot caustic lime, the heat being generated by the hydration of the uniformly distributed and uniformly divided lime.

I have referred to lime at fifty mesh as suitable for sisal fibre. In such instance I use about twenty ounces of fibre to the usual barrel of two hundred and eighty pounds of lime. The fibre is preferably carded or otherwise opened out and shredded and then thoroughly mixed with the pulverized lime as described.

The proportion of fibre to lime above indicated is the usual commercial mixture in which the product is sold. While such a product has very great commercial advantages, I have found it possible where a more concentrated form is desired to use as low as five pounds of lime to one pound of sisal. It will be understood that such proportions depend on the strength of the lime and its degree of comminution and for such a concentrated mixture I would recommend a high caustic lime such as the higher grades of Rockland lime at at least fifty mesh fineness. It might be further added that with such proportions the slaking should take place before the addition of any inert ingredients such as sand, in order that the proper softening of the fibre may be attained. Such a concentrated mixture while useful under certain conditions where shipment of more extended mixtures would not be convenient, is not the most important form of my invention because while it is possible to effect the softening of fibre with the smaller amount of lime mentioned, it is of great commercial advantage to mix in the ultimate proportions so that the fibred lime can be packed at the plant and the lime used on the usual barrel basis. I therefore have mentioned the barrel basis of mixture as that gives a plaster making lime in fibred proportion and produces the desired result.

While I have made particular reference to sisal fibre, it will be understood that such is illustrative, as hemp or manila may be used or mixtures of fibres or even old rope or other second hand products made of fibre. The important point about the sisal is its strength and its low cost. Its defect was its wire like stiffness. My invention makes it possible to overcome this stiffness during the slaking of its admixed lime to reduce the gummy binder by half, so that the fibre is rendered soft and extremely flexible. Furthermore, the sand may be worked in even while slaking is going on, thus further saving time.

Various modifications may of course be made in the degree of fineness of the lime and in the character of the fibre, and in the proportions, all without departing from the spirit of my invention if within the limits of the appended claims.

What I therefore claim and desire to secure by Letters Patent is:

1. As a new composition of matter, a mixture for making plaster, consisting of an unsoftened fibre and finely divided unslaked lime in sufficient quantity to render in slaking substantially the entire mass of fibres soft and flexible.

2. As a new composition of matter, a mixture for making plaster, consisting of an unsoftened vegetable fibre and finely divided unslaked lime in sufficient quantity to render in slaking substantially the entire mass of fibres soft and flexible.

3. As a new composition of matter, a mixture for making plaster, consisting of a body of ligno-cellulosic fibre and finely divided unslaked lime in sufficient quantity to render in slaking substantially the entire mass of fibres soft and flexible.

4. As a new composition of matter, a mixture for making plaster, consisting of a body of sisal fibre and finely divided unslaked lime in sufficient quantity to render in slaking substantially the entire mass of fibres soft and flexible.

5. As a new composition of matter, a mixture for making plaster, consisting of an unsoftened vegetable fibre and pulverized unslaked lime, the particles of lime being of a size and in quantity sufficient to render in slaking substantially the entire mass of fibres soft and flexible.

In testimony whereof I affix my signature.

GEORGE B. WOOD.